(12) United States Patent
Agarwal et al.

(10) Patent No.: US 7,614,678 B2
(45) Date of Patent: Nov. 10, 2009

(54) ROTATING VEHICLE CONSOLE

(75) Inventors: Rishabh Agarwal, Mumbai (IN); Keith Chan, Arnold, MO (US); Anton Galkin, New York, NY (US); Ashwin Kapur, New Dehli (IN)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 89 days.

(21) Appl. No.: 11/958,882

(22) Filed: Dec. 18, 2007

(65) Prior Publication Data

US 2008/0179906 A1 Jul. 31, 2008

Related U.S. Application Data

(60) Provisional application No. 60/883,548, filed on Jan. 5, 2007.

(51) Int. Cl.
*B60R 11/06* (2006.01)
(52) U.S. Cl. .................... 296/37.1; 296/24.34
(58) Field of Classification Search ............. 296/24.34, 296/37.1, 37.8, 24.4, 63; 312/326; 348/836, 348/917, 918; 361/724; 224/539, 400
See application file for complete search history.

(56) References Cited

U.S. PATENT DOCUMENTS

| | | | | |
|---|---|---|---|---|
| 3,088,771 A * | 5/1963 | Weigle | ...................... | 296/37.5 |
| 3,251,638 A * | 5/1966 | Schwartz | .................... | 312/244 |
| 4,726,566 A | 2/1988 | Boland et al. | | |
| 5,179,447 A * | 1/1993 | Lain | ........................... | 348/837 |
| 5,441,042 A * | 8/1995 | Putman | ..................... | 600/102 |
| 5,687,945 A * | 11/1997 | Lee | .............................. | 248/918 |
| 5,743,585 A | 4/1998 | Pranger et al. | | |
| 5,788,015 A | 8/1998 | Seng et al. | | |
| 5,839,542 A | 11/1998 | Seng et al. | | |
| 5,918,841 A * | 7/1999 | Sweere et al. | ............... | 248/918 |
| 5,975,474 A * | 11/1999 | Kaplan et al. | ............... | 248/918 |
| 6,026,646 A * | 2/2000 | Hansen et al. | ................ | 62/3.6 |
| 6,179,263 B1 * | 1/2001 | Rosen et al. | ................ | 248/918 |
| 6,578,937 B1 * | 6/2003 | Thoman | ...................... | 312/107 |
| 6,971,697 B2 * | 12/2005 | Morales | ..................... | 296/37.1 |
| 7,410,138 B2 * | 8/2008 | Parsons | ..................... | 248/917 |
| 7,500,689 B2 * | 3/2009 | Pasternak et al. | ......... | 280/304.1 |
| 2005/0194871 A1 * | 9/2005 | Youngs et al. | .............. | 312/194 |
| 2006/0283899 A1 * | 12/2006 | Hill | ............................ | 224/400 |
| 2009/0096238 A1 * | 4/2009 | Misch | ....................... | 296/37.1 |

* cited by examiner

*Primary Examiner*—Kiran B. Patel
(74) *Attorney, Agent, or Firm*—Jeffrey P. Calfa; Mark C. Bach

(57) ABSTRACT

A console (10) for a vehicle includes a body (12) having a back panel (14), the body defining at least one storage compartment (22). A support assembly (40) is secured to a back panel (14) of the body (12) and is configured for attaching the body to a seat back (38). A hinge assembly (58) is secured to the support assembly (40) and configured for enabling rotation of the body (12) from a first position against the seat back (38) to a second position aligned with a seat armrest (70).

13 Claims, 9 Drawing Sheets

ROTATING VEHICLE CONSOLE

CROSS REFERENCE TO RELATED APPLICATION

The present application claims priority to Provisional Application No. 60/883,548 titled "Rotating Center Console" filed on Jan. 5, 2007, which is herein incorporated by reference.

FIELD OF THE INVENTION

The present invention relates generally to storage capabilities for a vehicle, and more particularly, to a storage console for a truck cabin.

BACKGROUND OF THE INVENTION

Truck cabins typically provide storage bins for accommodating personal belongings, vehicle paperwork and the like. Such bins are generally located in front of and to the side of the driver in overhead compartments which are large enough to store road atlases, log books and other oversized or bulky items. Although the overhead bins are sized to accommodate such items, they typically do not include dividers or partitions for storing smaller items, such as keys or medication. Accordingly, it can be difficult for the driver to easily access such small items from the bins, and if the driver is reaching around within the bins for these items while driving, road awareness can decrease. Further, although current storage bins prevent the floor of the cabin from becoming cluttered, they require the driver to reach overhead to gain access to his/her belongings, which is difficult for drivers with impaired mobility. Also, current storage bins for truck cabins do not typically include trash receptacles, which can lead to debris and garbage pile-up in the truck cabin, reducing the sanitary conditions within the vehicle.

To address these problems, many drivers have attempted to organize their belongings by placing small trash receptacles, partitioned storage bins or the like on the cabin floor in the space between the driver and passenger seats. Commercialized storage products for truck drivers have also been developed which attempt to address these problems. However, because these solutions are typically not secured to the cabin floor, they can move during vehicle operation, rendering it difficult for the driver to easily access his belongings and possibly interfering with proper driving of the vehicle. Further, because of their location on the floor, it can be cumbersome for aging truck drivers to reach down for the items while driving.

In addition, because current storage bins are typically located in the center of the cabin, in most cases the bins need to be moved so the driver can access the back or sleeping cabin of the truck. Such constant displacement can become burdensome and tiresome if the driver needs to access the back of the truck several times during vehicle use. Although some commercial storage consoles have been developed that can be secured to the cabin floor, such products are typically expensive, and they can still interfere with the driver's ability to easily access the back cabin of the truck because such products are generally permanently secured to the floor or require special tools to be removed from the floor.

SUMMARY OF THE INVENTION

A console for a vehicle includes a body having a back panel, the body defining at least one storage compartment. A support assembly is secured to a back panel of the body and is configured for attaching the body to a seat back. A hinge assembly is secured to the support assembly and configured for enabling rotation of the body from a first position against the seat back to a second position aligned with a seat armrest.

DESCRIPTION OF A PREFERRED EMBODIMENT

Figure 1:
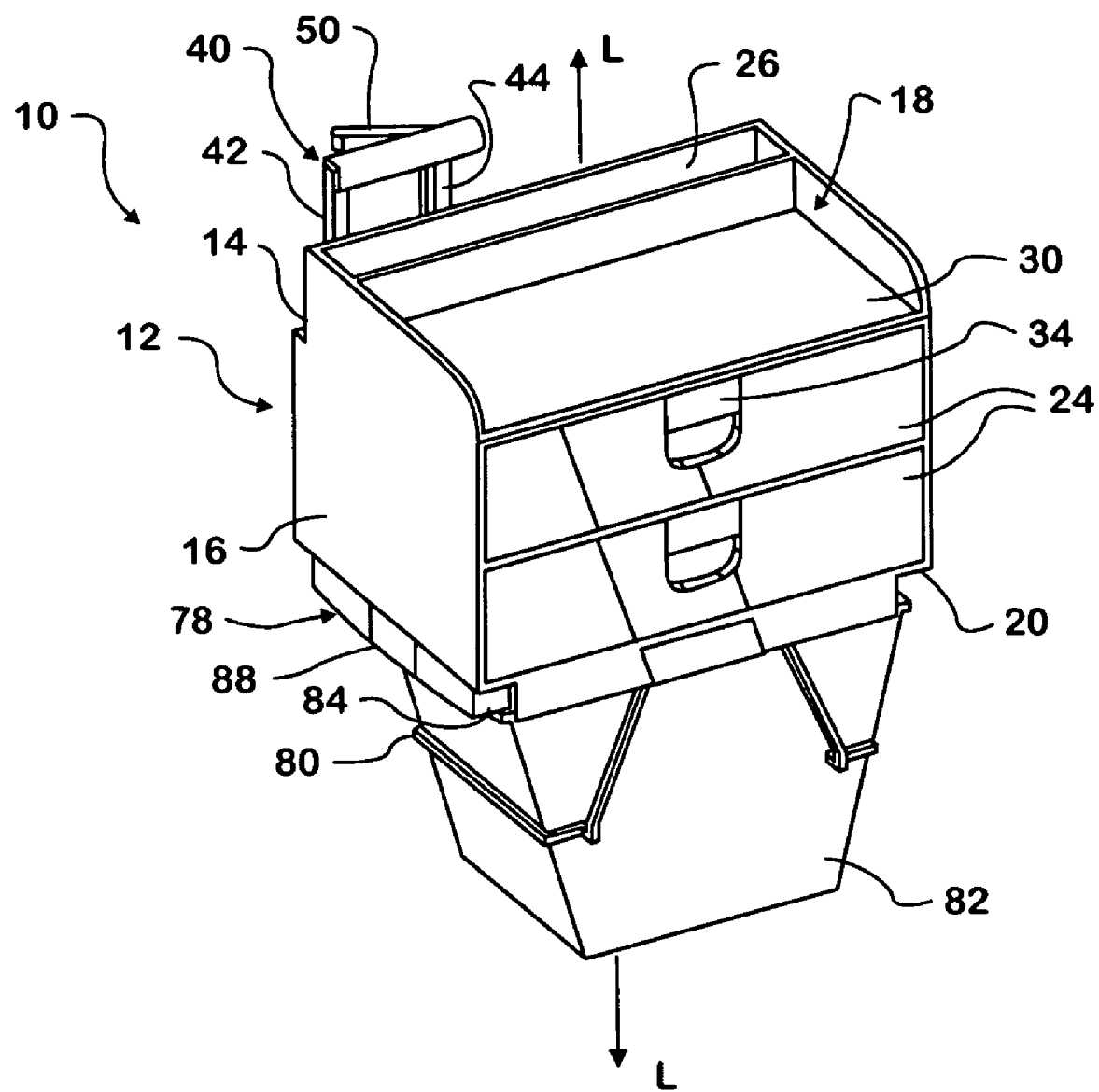
FIG. 1 is a top perspective view of a vehicle console in accordance with the invention.
Figure 2:
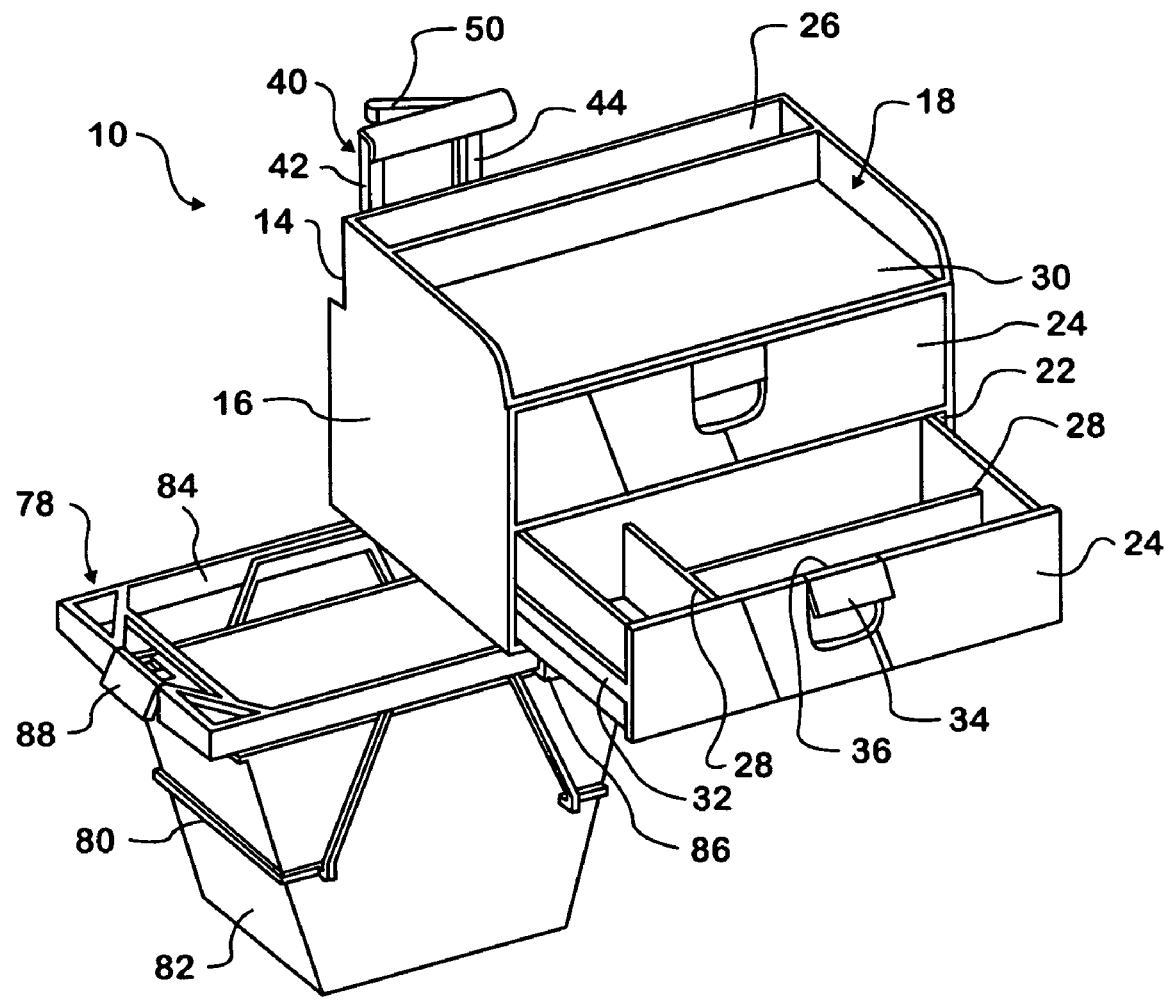
FIG. 2 is a partially exploded perspective view of the vehicle console of FIG. 1 in accordance with the invention.

Referring to FIGS. 1 and 2 a console for a vehicle (not shown) is generally designated 10 and includes a body 12 having a back panel 14, a pair of oppositely located side walls 16, a top panel 18 and a bottom panel 20. The body 12 defines at least one and advantageously a pair of storage compartments 22, each compartment being configured for slidably receiving a drawer 24. To provide further storage space, the back panel 14 defines a chamber 26 arranged substantially parallel to a longitudinal axis "L" of the body 12.

Although other dimensions may be appropriate, the body 12 is advantageously 9"×12"×8", such that the body 12 provides ample storage space without interfering with the empty space in the truck cabin. The drawers 24 are each advantageously 3"×12"×6", and the chamber 26 is favorably 8"×12"×2", although other dimensions may be suitable, depending on the application. Specifically, it is contemplated that by providing the above dimensions, the drawers 24 and chamber 26 will provide ample storage space for a driver's belongings, such as folders, log books, keys, medicine, wallets, cell phones and the like.

To further organize the driver's belongings, one or both of the drawers 24 includes a plurality of removable partitions 28 that can be arranged within the drawer to suit the driver's needs. It is contemplated that the partitions 28 are advantageous over current consoles that typically provide a single compartment storage bin because they separate the driver's smaller items for easier access.

If the driver needs to quickly access belongings but does not wish to store the items in the drawers 24, the top panel 18 defines a tray 30 that is surrounded by the side walls 16 and back panel 14. The tray 30 can optionally include partitions (not shown) for a beverage or for the driver's cell phone, for example.

Each of the drawers 24 includes a pair of rods 32 configured for engaging corresponding channels (not shown) defined in the side walls 16, to enable easy sliding of the drawers within the respective storage compartment 22. To prevent opening of the drawers 24 during vehicle movement, each drawer 24 further includes a handle 34 having a latch 36. The latch 36 is configured for engaging a corresponding notch (not shown) defined in the storage compartment 22. The handle 34 is biased such that when the driver pulls the handle towards himself, the latch 36 disengages the notch and the drawer can open. Similarly, to lock the drawer 24, the driver pushes the drawer towards the back panel 14 until the latch 36 engages the notch, securing the drawer in a closed position. It has been found that the present latch/notch locking mechanism can experience vibrations of up to 8 Hz without the latch 36 disengaging from the notch during vehicle movement. However, it is recognized that alternate methods for locking the drawers 24 in the closed position may be appropriate.

Figure 3:
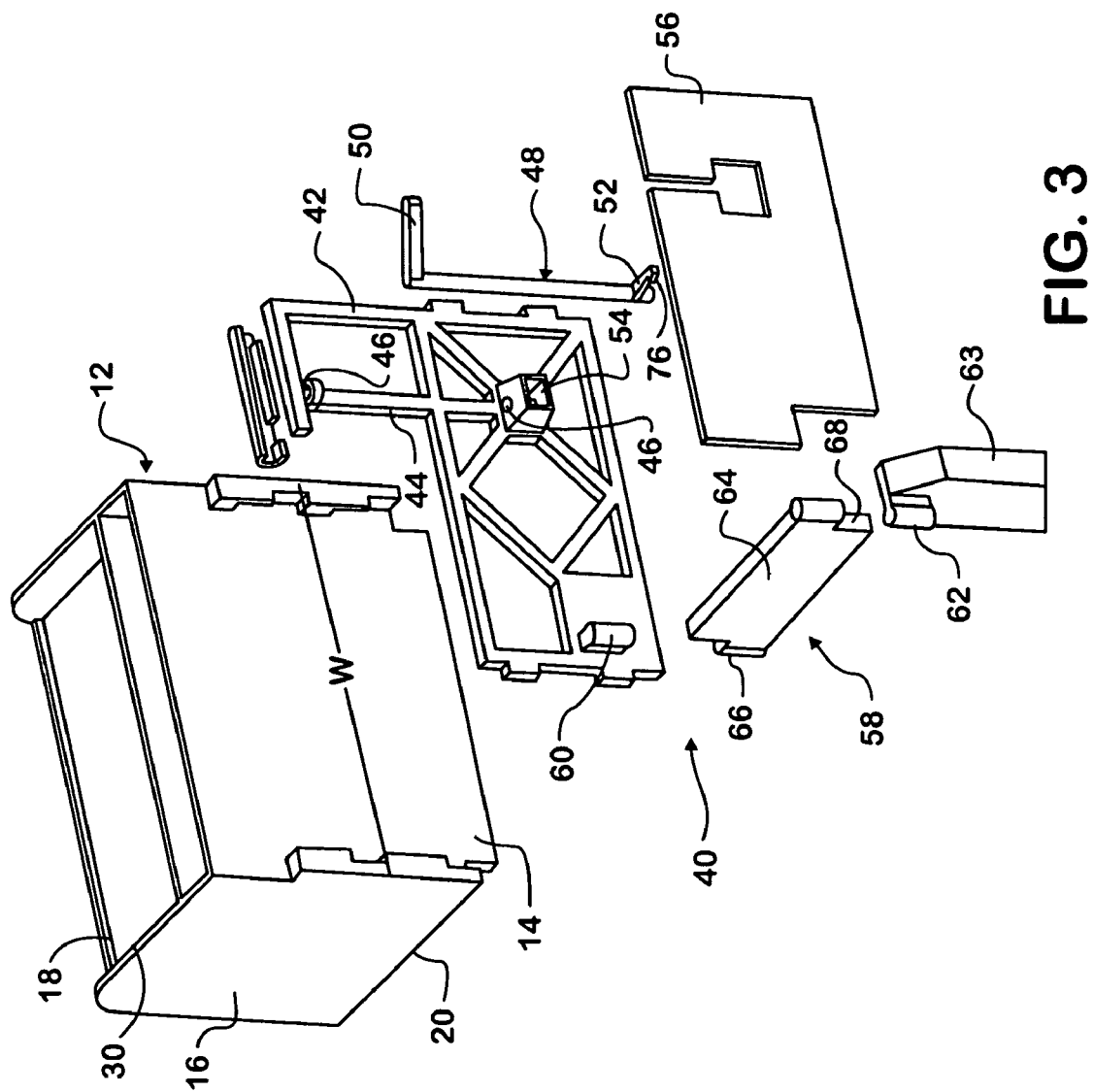
FIG. 3 is an exploded rear view of a support assembly for the vehicle console in accordance with the invention.
Figure 5:
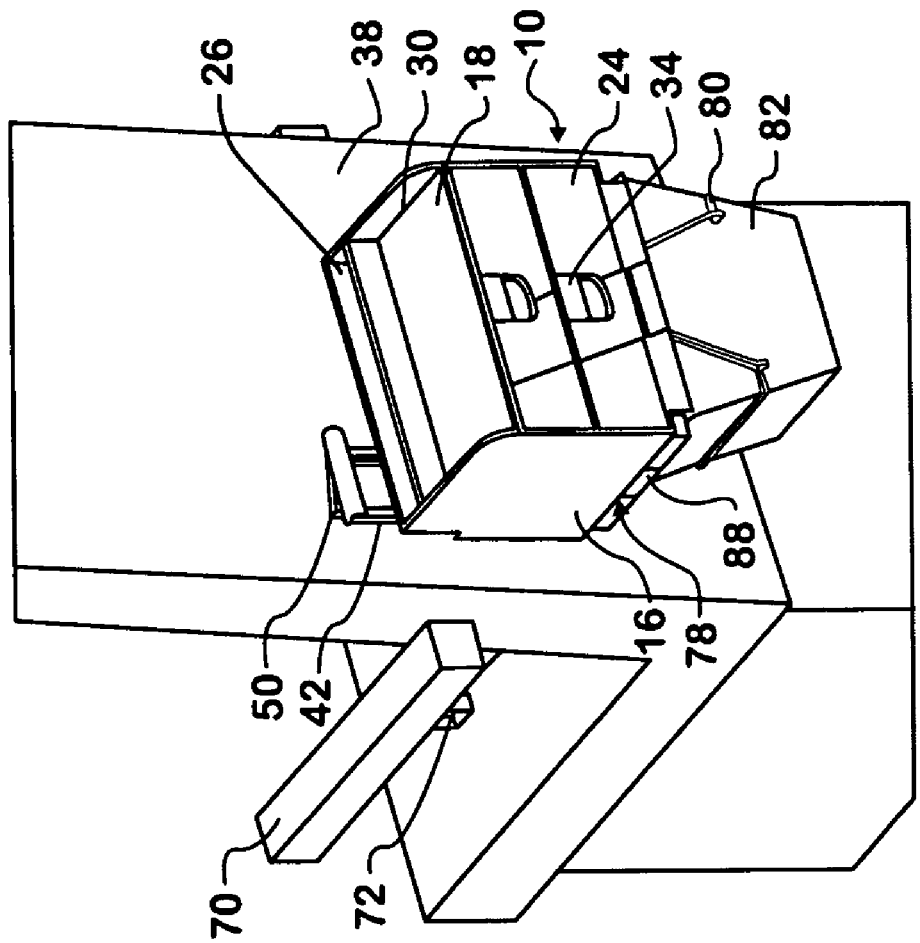
FIG. 5 is a front perspective view of a vehicle cabin showing the vehicle console in a first position relative to a vehicle passenger seat in accordance with the invention.
Figure 5:
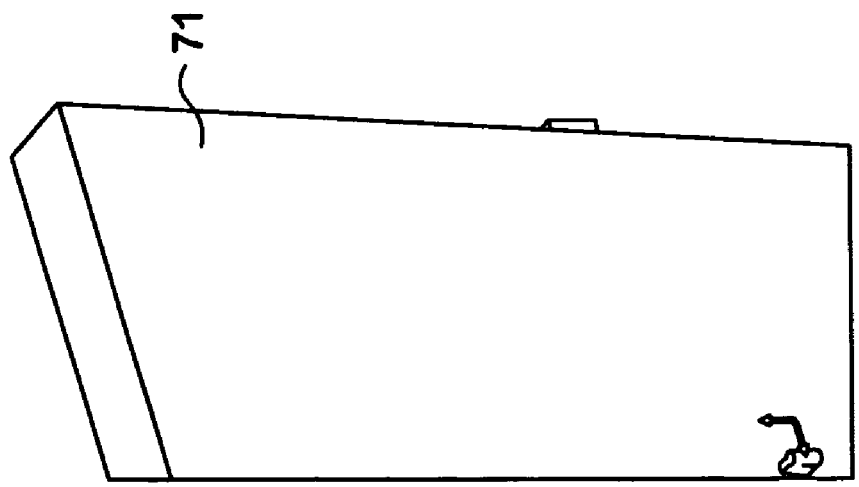
Figure 6:
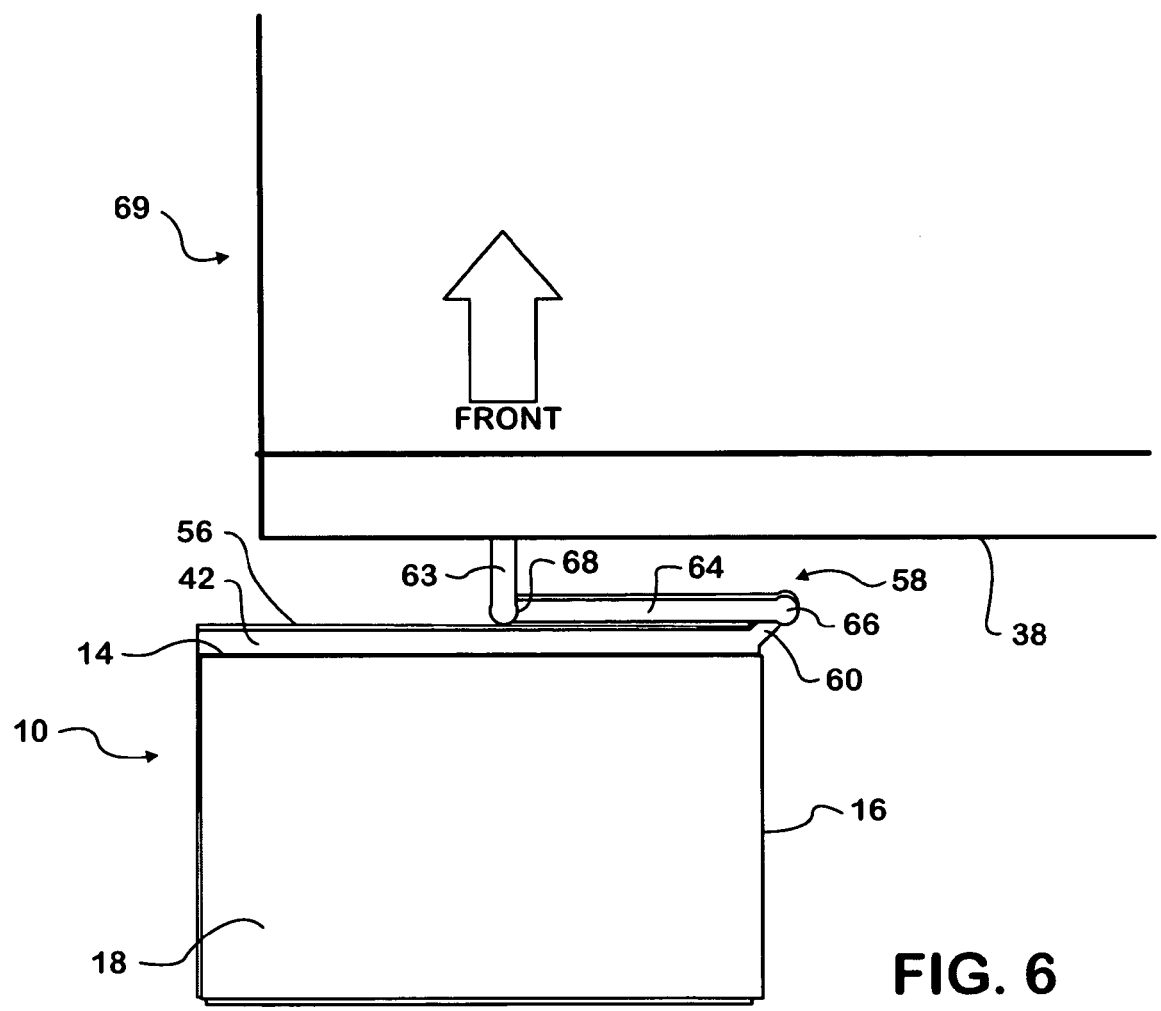
FIG. 6 is a top schematic view showing the orientation of the support assembly in the first position in accordance with the invention.

As seen in FIGS. 3, 5 and 6, the console 10 is configured for attachment to a passenger seat 69 and advantageously to a passenger seat back 38. To provide such attachment, the console 10 includes a support assembly 40 secured to the back panel 14 of the body 12. The support assembly 40 includes a support frame 42 extending along a width "W" of the back panel 14 and secured to the back panel by fasteners or the like (not shown). The frame 42 includes a support bar 44 defining a pair of vertically aligned through holes 46 configured for receiving a lever arm 48.

The lever arm 48 includes a top end having a gripping shaft 50, and an opposite end having a finger 52 extending therefrom. Upon insertion in the through holes 46, the finger 52 is surrounded by and protrudes from an enclosure 54 extending from the support frame 40 in a direction distal from the back panel 14, as seen in FIG. 3. As will be described in further detail below, the lever arm 48 is preferably biased by a spring or similar biasing member (not shown), and is configured for transitioning the arm from an unlocked position to a locked position. To maintain a smooth and planar surface of the console 10, a cover 56 is secured to an exposed side of the support frame 42 and defines an aperture for receiving the enclosure 54.

Figure 4:
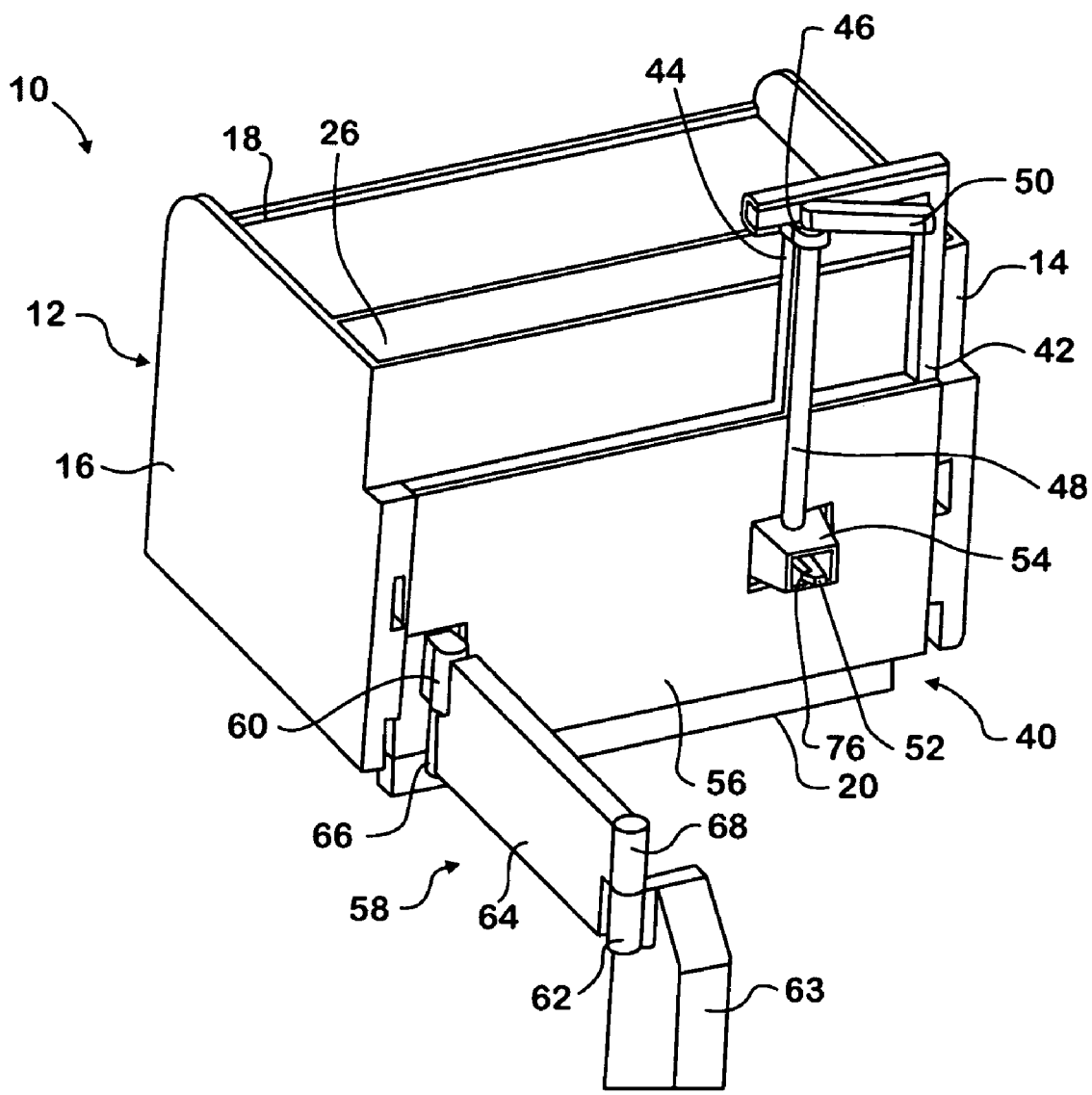
FIG. 4 is a rear view of the support assembly for the vehicle console in accordance with the invention.
Figure 7:
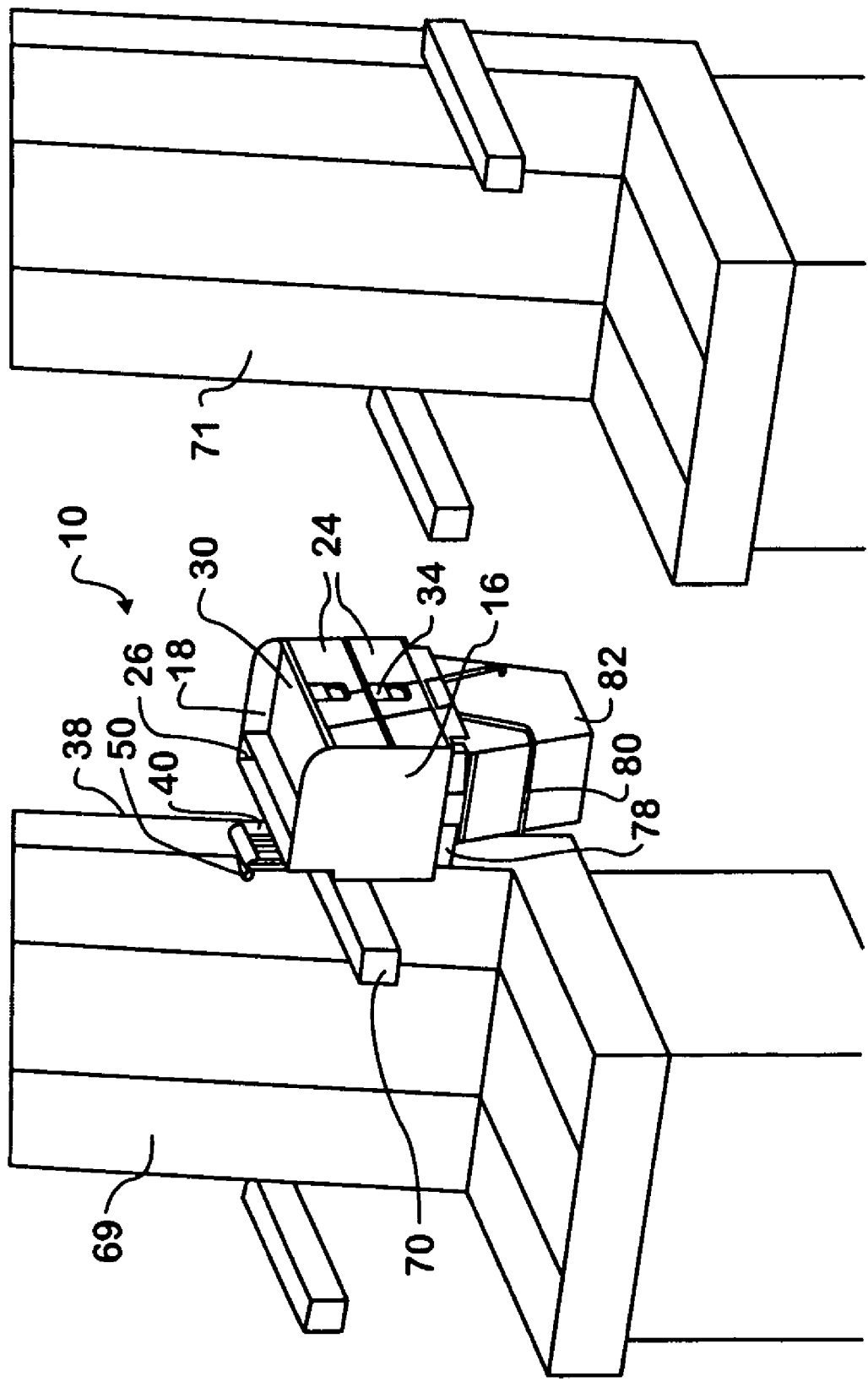
FIG. 7 is a perspective view of the vehicle cabin showing the vehicle console in a second position relative to the vehicle passenger seat in accordance with the invention.
Figure 8:
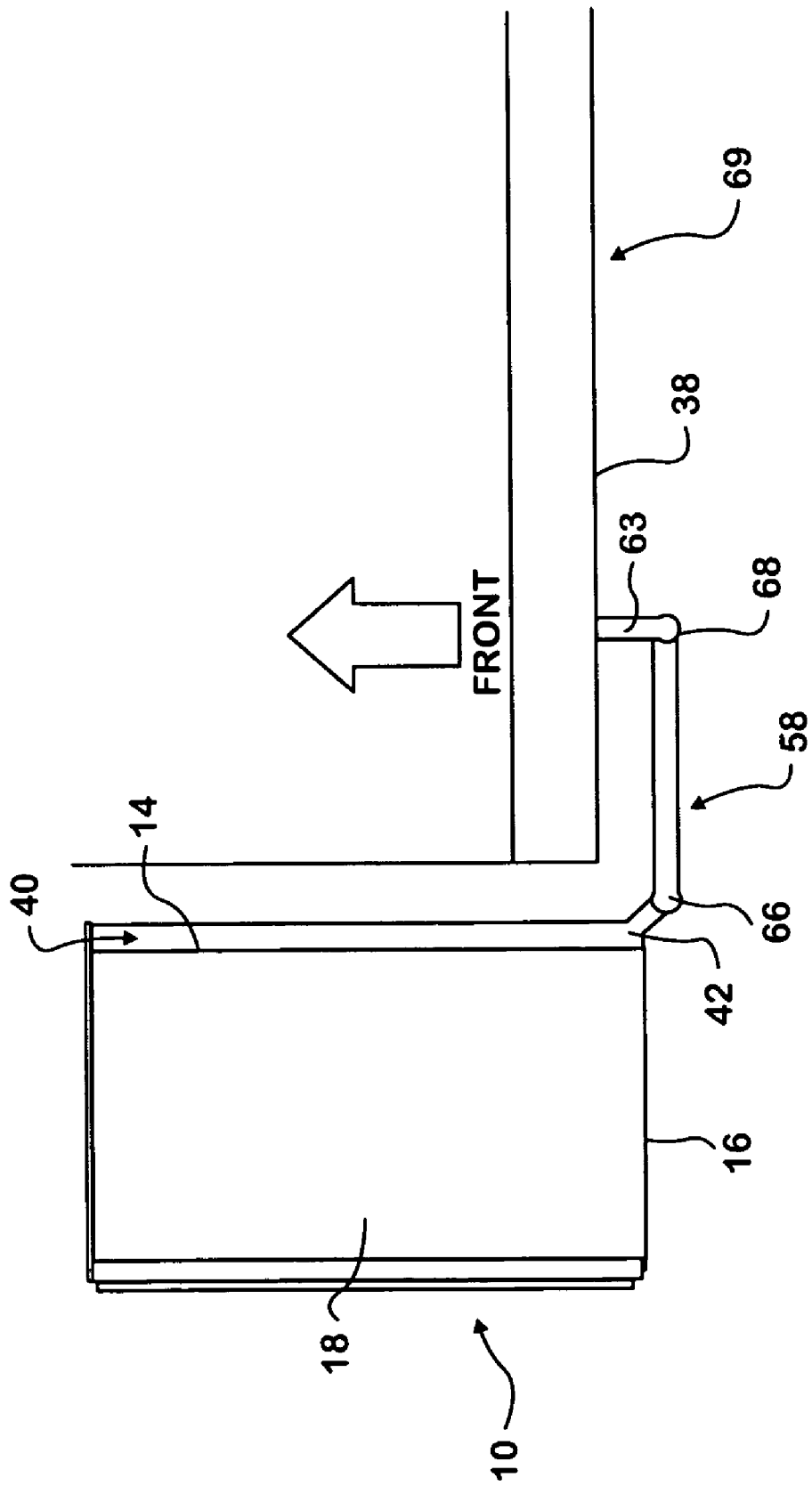
FIG. 8 is a top schematic view showing the orientation of the support assembly in the second position in accordance with the invention.

The present console 10 is constructed and arranged for rotating relative to the seat back 38 from a first position (FIGS. 5 and 6) to a second position (FIGS. 7 and 8). To enable such rotation, the console 10 further includes a hinge assembly 58 including a first hinge 60 provided on the support frame 42 and a second hinge 62 (FIG. 3) secured to the seat back 38 by a support bracket 63. A support arm 64 is also provided and has a first end 66 attached to first hinge 60 and an oppositely located second end 68 attached to the second hinge 62, as seen in FIGS. 3 and 4. The support arm 64 enables operation of the first and second hinges 60, 62.

Specifically, when the vehicle is not in motion or when the driver does not need access to his belongings while driving, the console 10 is stored behind the seat back 38, as seen in FIGS. 5 and 6. In this first position, the support arm 64 is in a non-extended position and is adjacent to the cover 56, such that the driver's belongings are still accessible if the driver is in the back or sleeping cabin of the truck. However, when the vehicle is in motion and the driver needs quick access to important belongings, the driver grips the body 12 or handle and pulls the console towards him (i.e., in a direction towards a driver's seat 71), such that the first hinge 60 rotates approximately 180° until the support arm 64 is in an extended position. When the support arm 64 is fully extended, the second hinge 62 rotates the console approximately 90° until the console is adjacent to an armrest 70 of the passenger seat 69 (FIGS. 7 and 8).

From this second position adjacent the armrest 70, the driver can easily open the drawers 24 or access belongings placed in the chamber 26 or on the tray 30. It is contemplated that the present rotatable console 10 is advantageous over current overhead storage bins because it does not require the driver to stretch or reach overhead while driving. Further, because the console 10 can be easily stored behind the seat back 38 when not in use, the space between the passenger seat 69 and the driver seat 71 remains open, allowing the driver to easily access the back cabin of the truck. Also, because of its relatively compact size, even when in the extended or second position, the console 10 has plenty of room to rotate back to the non-extended first position without unnecessarily interfering with the space provided between the passenger and driver seats 69, 71.

Figure 7A:
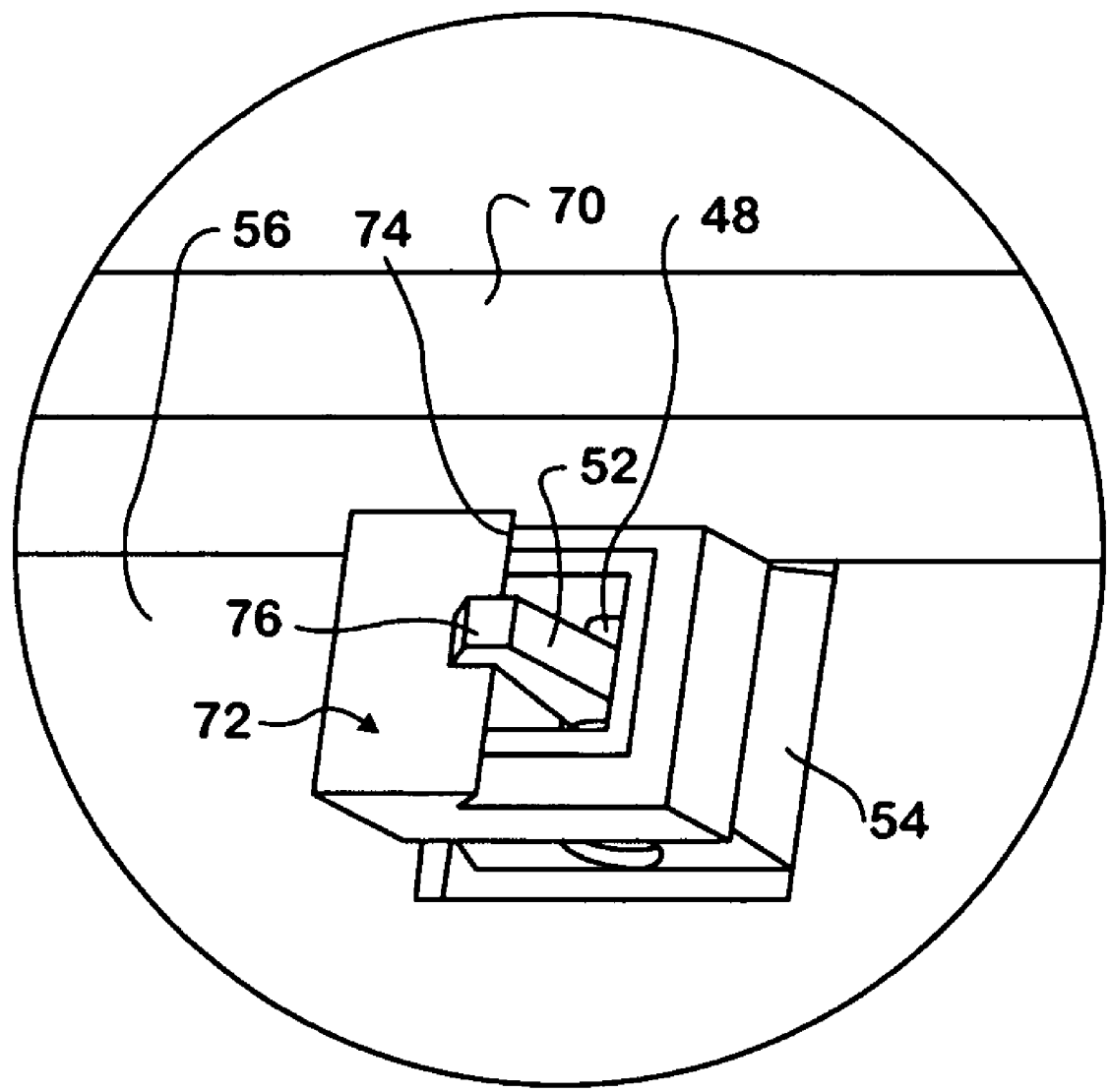
FIG. 7A is a detail view showing the console secured in the second position relative to the vehicle passenger seat in accordance with the invention.

To prevent movement of the console 10 in the second position during vehicle operation, a locking slot 72 is attached to the armrest 70, best shown in FIG. 7A. The locking slot 72 includes a tab 74 that is configured for engaging a tip 76 of the finger 52 and securing the console 10 in the second position. To lock the console 10 in place, the driver pushes the console 10 or the gripping shaft 50 until the tip 76 engages the tab 74. Similarly, to unlock the console 10 from the second position, the driver grabs the gripping shaft 50 and pulls it towards him in a direction away from the passenger seat. The biasing member (not shown) actuates the finger 52 such that the tip 76 disengages from the tab 74, enabling movement of the console 10 back to the first position behind the seat back 38.

The present console 10 is also configured for providing a receptacle to store the driver's trash. Specifically, referring back to FIGS. 1-4, the console 10 includes a frame assembly 78 attached to the bottom panel 20 and defining a cage 80 configured for receiving a trash receptacle 82. The frame assembly 78 includes a pair of oppositely located rails 84 slidably received in a corresponding pair of tracks 86 defined by the bottom panel 20. As known in the art, the rails 84 enable lateral movement of the frame assembly 78 relative to the body 12. Specifically, when the console 10 is in the second position (FIGS. 7 and 8), the frame assembly 78 is configured for moving laterally in a direction towards the front of the vehicle (as indicated by the directional arrows in FIGS. 6 and 8), to maintain sufficient space between the passenger seat 69 and the driver seat 71.

To prevent movement during vehicle operation, the frame assembly 78 includes a locking mechanism 88 configured for engaging a corresponding slot (not shown) defined in the bottom panel 20 for securing the frame assembly to the body 12. Further, it is contemplated that when the frame assembly 78 is secured to the body 12, any spillage or odor from the trash receptacle 82 will be prevented because the bottom panel 20 serves as a lid or enclosure for the receptacle.

The present rotating center console may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A console for a vehicle, comprising:
    a body having a back panel, the body defining at least one storage compartment;

a support assembly secured to the back panel of the body and configured for attaching the body to a seat back; and a hinge assembly secured to the support assembly and configured for enabling rotation of the body from a first position against the seat back to a second position aligned with a seat armrest.

2. The console of claim 1 wherein the at least one storage compartment is configured for slidably receiving a drawer.

3. The console of claim 2 wherein the at least one drawer includes a latch for engaging a notch defined in a corresponding one of the storage compartments.

4. The console of claim 1 wherein the back panel defines a chamber arranged substantially parallel to a longitudinal axis of the body.

5. The console of claim 1 wherein the body further comprises a top panel, a pair of oppositely located side walls, and a bottom panel.

6. The console of claim 1 wherein the support assembly includes a support frame secured to the back panel.

7. The console of claim 6 wherein the hinge assembly includes a first hinge provided on the support frame, a second hinge secured to the seat back, and a support arm having a first end attached to the first hinge and a second, opposite end attached to the second hinge, the hinge assembly enabling rotation of the console.

8. The console of claim 6 wherein the support assembly further includes a lever arm attached to the support frame, the lever arm including a gripping shaft end and an oppositely located finger end.

9. The console of claim 8 wherein the lever arm includes a biasing member configured for biasing the arm from an unlocked position to a locked position.

10. The console of claim 8 further including a locking slot attached to the seat armrest and including a tab, the finger having a tip configured for engaging the tab and securing the console in the second position.

11. The console of claim 5 further including a frame assembly attached to the bottom panel and configured for receiving a trash receptacle.

12. The console of claim 11 wherein the frame assembly includes a pair of rails slidably received in a pair of tracks defined by the bottom panel, the rails enabling lateral movement of the frame assembly relative to the body.

13. The console of claim 11 wherein the frame assembly includes a locking mechanism configured for engaging a corresponding slot defined in the bottom panel for securing and axially aligning the frame assembly relative to the body.

* * * * *